INVENTOR.
John W. Ward
BY
John C. McGregor

Section 3-3

United States Patent Office 2,960,920
Patented Nov. 22, 1960

2,960,920

PHOTOGRAPHIC EQUIPMENT AND EXPOSURE CONTROL MEANS THEREFOR

John W. Ward, Syosset, N.Y., assignor to Specialties, Inc., Syosset, N.Y., a corporation of New York Filed Sept. 10, 1956, Ser. No. 608,928

8 Claims. (Cl. 95—10)

This invention relates to the control of photographic equipment and more particularly to exposure control apparatus adapted to effect its control continuously during operation of the photographic equipment.

Many attempts have been made to devise automatic exposure control apparatus which affords as its output a continuous indication of the radiation intensity as seen by the lens system of the photographic equipment and to effect an integrated control action whereby the equipment is automatically and continuously adjusted in accordance therewith. For the most part, previous efforts in this direction have yielded expensive equipment which is often heavy, cumbersome and, in some cases, unreliable.

It is, therefore, an object of the present invention to provide photographic equipment embodying exposure control apparatus.

Another object of the invention is to provide improved exposure control apparatus for photographic equipment which is light in weight, simplified in design, and positive and accurate in its action.

Another object of the invention is to provide an exposure control apparatus which yields a linear continuous output for continuously varying an adjustment of photographic apparatus as a function of integrated object brightness in the field of view or the radiation intensity impinging on the apparatus.

Yet another object of the invention is to provide photoelectric means for use, for example, in exposure control apparatus and which yields an output parameter representing the average brightness in a precisely defined field of view.

In accordance with the present invention, there is provided photographic equipment such, for example, as a motion picture camera including as a portion of its mechanism or as a remote component exposure control apparatus which scans its field of view, as by photoelectric means, and which yields an output parameter for controlling, preferably continuously, an illumination intensity compensator in the camera. The compensation can take the form for example of shutter speed control, lens aperture control, filter transmission control or the like, and it can be effected by powered driving means in the form of a servo system. In a preferred arrangement, a first signal is derived by the photoelectric means representing scene brightness and a second or feedback signal is derived from the compensating adjustment of the camera, the two being compared in a bridge circuit, the output of which in turn controls the powered driving means of the compensator. Hunting can be eliminated in accordance with the invention by means of a delay and reversing network in the power circuit which periodically reverses the polarity of the power to the driving motor at a rate which produces no net rotation. Unbalance of the bridge, indicating a change in object brightness relative to the correct camera setting, changes the timing of the power reversing cycle to produce a net rotation of the motor which effects the necessary compensation in the camera.

Details of a preferred embodiment of the invention from which the above and other objects and features will be apparent are described below having reference to the accompanying drawings in which.

Figure 2:
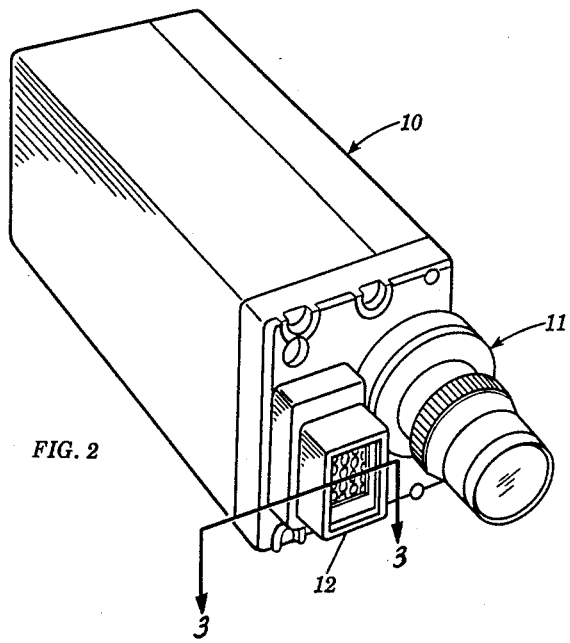
Figure 2 is a view in perspective of a motion picture camera in which the present invention is embodied.
Figure 3:
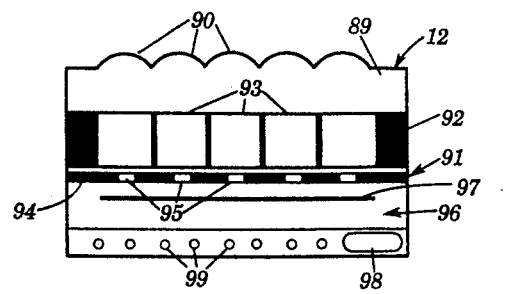
Figure 3 is a view in vertical section taken on the line 3—3 of Figure 2 looking in the direction of the arrows and illustrating details of the photoelectric-optical system which is part of the exposure control apparatus.

Referring first to Figures 2 and 3, the invention is illustrated as embodied in photographic equipment in the form of a 16 mm. motion picture camera identified generally by the numeral 10 and including a lens and shutter assembly 11 and, disposed closely adjacent thereto, photoelectric-optical means 12 of scene brightness measurement exposure control apparatus for the camera.

Figure 1:
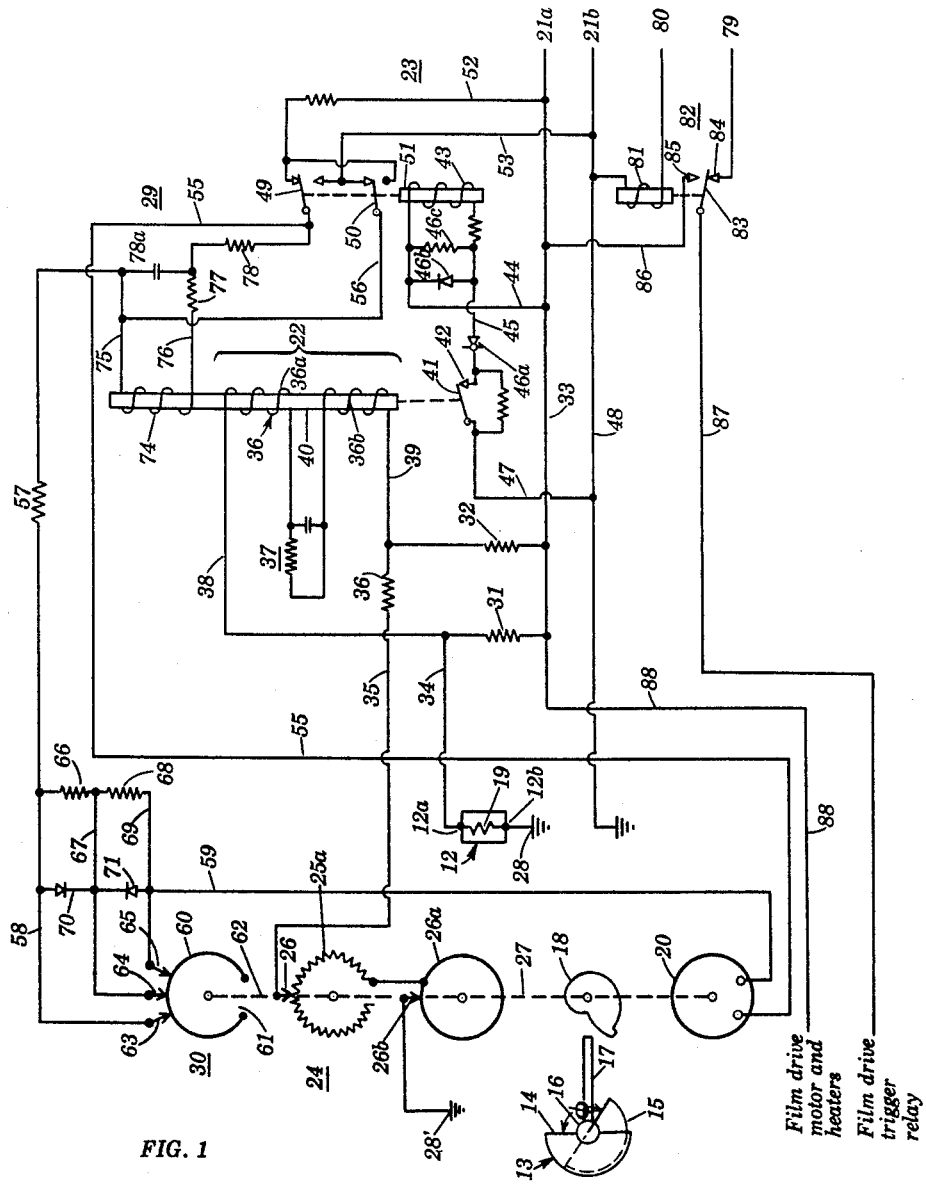
Figure 1 is a schematic diagram of an exposure control system, showing also how it is integrated with a motion picture camera.

As illustrated diagrammatically in the schematic diagram of Figure 1, the lens and shutter assembly 11 of the camera 10 includes a shutter section 13 which can take the form, for example, of a conventional rotary disc type shutter including a pair of semi-circular leaves or sections 14 and 15 which, in operation, turn as one on a drive shaft 16 driven in synchronism with the intermittent motion of the film (not shown). The two shutter sections 14 and 15 are also relatively rotatable on the shaft 16 under the control of an actuator 17 to vary the opening angle therebetween. This adjustment, which represents an illumination intensity compensation for the camera, can be effected while the shutter is rotating and the camera operating by shifting the actuator 17 axially in and out under the control of a shutter actuating cam 18.

Basically, the shutter opening is controlled by the photoelectric-optical means 12, the electrical element of which is represented in the schematic diagram of Figure 1 as a resistor 19, grounded at 23 and variable in accordance with light intensity. The details of the photoelectric-optical means are described more fully below having reference to Figure 3. The resistance value of the variable resistor 19 is a function of scene brightness and is caused to be reflected by the angular position of the shutter actuating cam 18 and hence the angle $\phi$ between the shutter sections 14 and 15. To this end the actuating cam 18, which affords a linear output action for achieving an infinite number of shutter angles, is coupled to a servo motor 20 adapted to be energized by the voltage across suitable sources 21a and 21b of positive and negative (ground) potentials, respectively.

The control of the motor 20 is effected through a servo control system including polarized relay means 22, a power relay 23 controlled thereby and including as its contacts reversing switch means, and feedback rheostat means 24, including a rotatable resistor 25a having a wiper contact 26 and coupled to the servo motor 20 by drive shaft 27. The resistor 25a is grounded by means of a collector ring 26a which turns therewith on the shaft 27 and which is grounded at 28' through a wiper contact 26b. Also included in the servo control system are a delay network, indicated generally by the numeral 29 and integrated with the polarized relay 22, and limit switch means 30, all described more fully below.

The variable resistor 19 of the photoelectric-optical means 12, and the variable resistor 25a of the feedback rheostat 24 are connected as arms in a servo-balanced, Wheatstone bridge circuit including also a pair of fixed resistors 31 and 32. Across one diagonal of the bridge is impressed the positive potential of the source 21a taken to ground at 28 and 28'. Certain windings, as described below, of the polarized relay means 22 are connected across the other bridge diagonal to be energized when conditions of unbalance obtain.

The details of the electrical connections for and the component parts of the bridge circuit and the power circuit which together make up the servo control system are now to be described.

In the bridge circuit, the positive potential source 21a is connected by means of a conductor 33 to the junction between the resistors 31 and 32, the former of which is connected by a conductor 34 to the variable resistor 19 grounded at 28, and the latter of which is connected by a conductor 35, including a fixed resistor 36, to the wiper contact 26 of the rheostat means 24 grounded at 28'.

In the power circuit, the polarized relay means 22 includes a winding 36 having two sections 36a and 36b connected in series through a resistor capacitor network 37, the two ends of the winding being respectively connected by conductors 38 and 39 to the junctions between the resistors 19 and 31 and between the resistors 36 and 32. The relay 22 also includes pole piece 40 magnetically coupled to switch means including a movable contact 41 and stationary contact 42 connected in series with the winding 43 of the power relay 23. One end of the winding 43 is connected by a conductor 44 to the positive potential source 21a and the other end by a conductor 45, a diode 46a to the stationary contact 42, the corresponding movable contact of which is connected by conductors 47 and 48 to the source of negative or ground potential source 21b. A second diode 46b can be connected across the winding 43, together with a parallel resistor 46c, the two diodes 46a and 46b and the resistor 46c serving to suppress inductive surges and thereby prevent arcing of the contacts 41, 42.

The power relay 23 includes as part of its reversing switch means, movable contacts 49 and 50 coupled magnetically to its pole piece 51 and each working between a pair of stationary contacts cross connected in conventional fashion and joined by conductors 52 and 53, respectively, to the potential sources 21a and 21b. The movable contact 49 is connected to the servo motor 20 by a conductor 55, while the movable contact 50 is connected to the servo motor through a circuit including a conductor 56, a resistor 57, a conductor 58, the limit switch means 30 and conductor 59. The limit switch means 30 includes a rotatable slip ring 60 having a gap 61 and driven by the motor 20 through a coupling 62. Three relatively closely spaced wiper contacts 63, 64 and 65 engage the slip ring which, therefore, affords a jumper therebetween at all times except when the gap 61 opposes one or more of the wiper contacts. A resistor 66 is connected across the wiper contacts 63 and 64 by means of the conductor 58 and a conductor 67 and a resistor 68 is connected across wiper contacts 64 and 65 by the conductor 67 and a conductor 69. Diodes 70 and 71 are connected across the conductors 58 and 67 and 67 and 69, respectively, and are polarized in opposite directions as indicated to conduct toward the common conductor 67. When the gap 61 appears opposite either of the wiper contacts 64 or 65, one of the diode resistor networks 66, 70 or 68, 71 is connected in series with the motor 20 to limit the power fed thereto only in the direction which would advance the gap 61 toward contact 64.

The time delay network 29 includes a winding 74 about a portion of the pole piece 40 of the polarized relay 22. The winding 74 is connected across the positive and negative sources 21a and 21b through the movable contacts 49 and 50, respectively, of the reversing switch power relay 23. This circuit includes, beginning at the upper end of the winding 74, a conductor 75, the conductor 56, the movable contact 50 and, when the circuit is set as shown in the drawing, the conductor 53 to the source 21b. The lower end of the winding is connected to the source 21a through a conductor 76, including resistors 77 and 78, the contact 49 and the conductor 52. A capacitor 78a is connected across the winding 74.

If desired, control means for the camera can be provided in the form of a trigger control conductor 79 and a radar camera control conductor 80, the latter being connected through a winding 81 of a power relay 82 to the source 21b. The relay 82 includes a movable contact 83 of which engages selectively a contact 84 in the trigger circuit or a contact 85 which is joined by a conductor 86 to the source 21a whereby the radar control circuit can operate the camera film drive. The movable contact 83 is connected to the film drive motor (not shown) through a conductor 87 and suitable relay means. Power for heaters, described below, and for the film drive motor is derived through a conductor 88 and the conductor 33 to the power source 21a.

Referring now to Figure 3, the photoelectric-optical means indicated generally by the numeral 12 includes a multicellular lens 89 including a plurality of individual lens sections 90, disposed adjacent each other either on hexagonal coordinates, as shown in Figure 2, or if desired on rectangular coordinates. An individual image is formed by each lens section 90 and this multiplicity of images is uniformly dispersed across an image or focal plane 91. A baffle 92 is interposed between the image plane 91 and the multicellular lens 89 to prevent light from wide angle rays of the lens sections from masking the images of adjacent lens sections. To this end the baffle includes a series of deep walled cells 93, which can be rectangular in cross section, for example, and the axes of which are aligned, respectively, with the axes of corresponding lens sections 90. If desired, a field control mask 94 can be disposed just beneath the focal plane 91 to restrict what is seen by the optical system, the mask including a plurality of openings 95, also respectively aligned with axes of the baffle cells 93 and the lens sections 90. The size of the openings 95 is such that the image passed therethrough is precisely identical to that seen by the lens of the lens and shutter assembly 11 of the camera 10. It will be understood that the field control mask 94 can be dispensed with in those cases in which the size and geometry of the baffle 92 is such that it performs the function of the mask. If desired, the masks can be interchangeable to accommodate different camera lenses.

Disposed beneath the focal plane 91 is a photoelectric element 96 including a photosensitive surface 97. The photoelectric element 96 can be of the type generally referred to as a photoconductive cell utilizing photosensitive properties of a family of semi-conductors. Greatly increased light sensitivity with high output power is obtained by using a photosensitive element comprised of a multitude of semi-conductor crystals evaporated over a glass surface. Interleaving conducting combs (not shown) serve as terminals indicated by the numerals 12a and 12b respectively in the schematic diagram of Figure 1. If desired, a thermostat element 98 can be disposed adjacent the photoelectric element 96 to control resistance heater means 99 (energized by the conductor 88 of Figure 1) for maintaining a fixed temperature for purposes of stability. If desired, a color filter, not shown, can be used in the assembly either in front of or behind the lens 89. It should also be assumed that the entire assembly 89, 90, 91, 92, 93, 94, 95, 96, and 97 may be cast or molded as an integral component including all of the above items for the sake of convenience and manufacturing ease. Any suitable transparent material may be used for this embodiment and the baffle 92 may be composed of opaque plastic or other material cast or molded therein.

In operation, assuming the motion picture camera 10 is actuated by driving its shutter 13 and, synchronized therewith its film supply (not shown), the photoelectric-optical means 12 will automatically and continuously drive the shutter actuating cam 18 in such fashion that a continuous, linear adjustment of the camera shutter 13 results in accordance with the light impinging on the main lens assembly 11 of the camera, that is, the shutter opening is reduced automatically and continuously as the light or illumination intensity increases and it is increased as the light intensity decreases. To this end, the multicellular lens 89 and in particular its lens sections 90 as masked by the baffle 92 and, if used, the field control mask 94, casts upon the photoelectric element 96 a plurality of identical images corresponding exactly to the image as seen by the main camera lens as impressed on the film of the camera. The combined effect of each of these images on the photosensitive surface 97 is such that the electrical conductivity of the element 96, i.e., the resistor 19 of Figure 1, varies to a relatively large degree.

Referring now to the schematic diagram of Figure 1, let it be assumed that there is no error signal in the system, which is to say the shutter adjustment is proper for the brightness or light intensity of the object seen by the camera and the resistance value of the variable resistor 19 is stable. The voltage across the positive and negative sources 21a and 21b is impressed across the capacitor 78a through the resistor 78 of the time delay network 29. The capacitor charges at a rate determined by its capacity and the combined resistances of the resistors 77 and 78. The resistance of the winding 74 of the relay 22 can be regarded as negligible when compared with that of the resistors 77 and 78. As the voltage across the capacitor 78a increases, the current in the resistor 77 is always equal to the current in the winding 74. As this current increases, the flux in the polarized relay changes, and at a time, $t$, when the voltage across the capacitor has reached the value of approximately the source voltage, E, divided by 4, the relay 22 actuates to close the contacts 41—42. This operates the power relay 23 to change over the contacts 49 and 50 of its reversing switch connections and the charge and the condenser 78a begins to change as a result of the reversal of the polarity of the source voltage at the input of the delay network. When the voltage reaches the value of $$-\frac{E}{4}$$

the polarized relay is again actuated to open its contacts 41—42 and actuate the reversing switch of the power relay 23, thereby perpetuating the oscillatory cycling of the system. The voltage across the delay network and hence across the motor 20 will, therefore, be equal to E for approximately 180° of the cycling period and equal to −E for the remainder.

The motor 20, which is a permanent magnet D.C. motor excited by the voltage across the sources 21a and 21b, will rotate in one direction or the other, depending upon the polarity of its input. Proper matching of the cyclic period of the time delay system and the torque and inertia of the motor, however, will result in no net rotation, that is the motor will be stalled in the absence of an error signal. The cyclic period of a representative system is 50 milliseconds and the stalled motor at the null condition of the bridge circuit is correct for a balanced servo loop.

Assuming now the error signal is applied across the winding of the polarized relay 22, due to an unbalancing of the bridge network (including resistors 19, 31, 32 and 25a) by a change in the value of resistor 19 representing a change in the degree of brightness of the camera object, a biasing flux will be present in the pole piece 40 which will aid the flux produced by the current flowing in 74, and thereby close the contacts 41—42. A shorter time, $t$, therefore, elapses during the period when the voltage of one polarity is impressed across the motor 20 than in the case of the other polarity. The average value is no longer zero and the motor 20 rotates in a direction which will adjust the rheostat 24 to reduce the error signal across the bridge diagonal and hence the winding 36 of the relay 22, thereby restoring the system to balance. Large values of current flowing in the winding 36 such that the current in the winding 74 cannot overcome the biasing flux of the winding 36, will lock the system in one polarity, thereby facilitating rapid correction of large errors. As the error signal is reduced, the oscillatory condition is once more established and with the continued error correction by means of the duty cycle of the power relay 23, perfect balance is approached with no overshoot or hunting.

It will be understood, therefore, that the present invention uses exposure time control as the method of compensation for object brightness variations and that it solves the basic photometric problem as represented by the following equation:

$$B_0 = \frac{K_1 \pi f^2 K_2 K_3}{TS} \text{ in foot-lamberts}$$

where:

$B_o$ is the brightness of the object
$K_1$ is a constant determined by the film rating system and the desired placement of the exposure on the $d$-log E curve of the film. (Typically 1.25 for ASA ratings.)
$f$ is the numerical value of image distance/entrance aperture of the photographic objective.
$K_2$ is the filter factor of any color filter used, $K_2 = 1/\text{Transmission}$.
$K_3$ is the factor for any light attenuating device in the object or image space. $K_3 = 1$ Transmission.
T is the exposure time in seconds.
S is the sensitivity rating of the film emulsion, compatible with the requirements of $K_1$.

It will be understood, moreover, that the invention can be applied to exposure control by adjustment of lens aperture, shutter speed, filter transmission, or combinations of these or other control means in any camera or photographic recording device. If desired, the entire system can be included within the housing of a camera unit or parts of the control system can be isolated in a separate housing joined to the main housing by electrical cables. Also, it will be understood that while the invention has been described above in a preferred embodiment in which visible light is the basic actuating variable, the invention can also be embodied in apparatus responsive to light in the non-visible spectrum and to other radiations such, for example, as gamma radiation from X-ray or radioactive sources, and the words "radiation intensity" as used herein are intended to cover such parameters. The invention should not, therefore, be regarded as limited except as defined by the following claims.

I claim:
1. In photographic equipment having adjustable radiation intensity compensating means, means to derive a continuous sequence of first signals representative of the adjustment of said compensating means, means to derive a continuous sequence of second signals representative of radiation intensity seen by the photographic equipment, means to compare continuously said first and second signals to derive continuously a control signal representative of a relationship between the first and second signals, the invention comprising reversible motive means to drive the compensating means, means to energize said motive means comprising a source of electrical signals of continuously reversing polarity normally having a period for each polarity less than that to which said motive means is responsive, whereby the motive means is normally stalled, and control means responsive to said control signal representative of a relationship between the first and second signals to change the period of at least one polarity of the output of said means to energize the motive means, whereby the motive means is driven in a direction to operate said compensating means as a function of the radiation intensity.

2. In photographic equipment having adjustable radiation intensity compensating means, means to derive a sequence of first signals representative of the adjustment of said compensating means, means to derive a sequence of second signals representative of radiation intensity seen by the photographic equipment, means to compare said first and second signals to derive a sequence of control signals representative of a relationship between the first and second signals, motive means responsive to said control signals for adjusting the said compensating means, and a source of electrical energy for said motive means, the invention comprising reversing switch means for reversing the polarity of the signals to the motive means to reverse the direction of movement thereof, actuating means for continuously operating said reversing switch means over balanced reversing cycles of insufficient duration in each polarity to operate the motive means, and means responsive to said control signal to increase the duration of the signal of one of the polarities to achieve an output motion in said motive means for effecting adjustment of the radiation intensity compensating means of the photographic equipment.

3. Photographic equipment as set forth in claim 2, said control means having a range of output signals, one portion of the range effecting disproportionate timing in the polarity reversing cycle and the second portion effecting continuously one polarity in the reversing switch means to energize the motive means for movement in one direction over a period exceeding a complete normal reversing cycle.

4. Photographic equipment as set forth in claim 1, said means for actuating said adjustable compensating means including cam means driven by said motive means, said means to derive signals representative of the adjustment of said compensating means including a variable resistor also driven by said motive means, said means to derive signals representative of radiation intensity comprising photoconductive resistor means having a resistance value representative of radiation intensity, and resistance bridge means including said photoconductive resistor and variable resistor in its arms.

5. Photographic apparatus as set forth in claim 4, voltage means connected across one diagonal of the bridge and polarized relay connected across the other diagonal of the bridge and switch means actuated by the polarized relay to operate said motive means.

6. Photographic equipment as set forth in claim 5, a source of electrical energy to energize said motive means, and said switch means operated by the polarized relay comprising reversing switch means to reverse the polarity of the signal to the motive means to reverse the direction of rotation thereof.

7. Photographic equipment as set forth in claim 6, including a time delay network in the circuit energizing said motive means including a relay winding in said polarized relay for continuously operating said switch means normally over two half cycles of opposite polarity of insufficient duration to actuate the motive means, whereby an error signal across the output bridge diagonal changes the relative durations of the two half cycles of polarity to the motive means to effect net rotation thereof.

8. In photographic equipment having adjustable radiation intensity compensating means, and a reversible D.C. motor to drive the compensating means, the invention comprising means to energize the motor including a voltage source of continuously reversing polarity and normally having a period for each polarity which is insufficient to drive the motor in either of its directions of motion, means to derive control signals representative of a differential between a desired setting of the compensating means and an actual setting thereof, and means responsive to the control signals to increase the period of the voltage source selectively for either one of its polarities to drive the motor in a corresponding one of its directions to effect adjustment of said compensating means.

References Cited in the file of this patent

UNITED STATES PATENTS

| | | |
|---|---|---|
| 2,058,531 | Tuttle | Oct. 27, 1936 |
| 2,059,032 | Riszdorfer | Oct. 27, 1936 |
| 2,248,758 | Higonnet et al. | July 8, 1941 |
| 2,388,609 | Ericsson | Nov. 6, 1945 |
| 2,481,678 | Mihalyi | Sept. 13, 1949 |
| 2,655,086 | Walker | Oct. 13, 1953 |
| 2,655,848 | Gray | Oct. 20, 1953 |
| 2,683,402 | Bruck | July 13, 1954 |